(12) United States Patent
Murakami et al.

(10) Patent No.: US 7,218,026 B2
(45) Date of Patent: May 15, 2007

(54) MOTOR

(75) Inventors: Hiroshi Murakami, Osaka (JP);
Hisakazu Kataoka, Fukui (JP);
Akihiko Watanabe, Fukui (JP);
Hiroaki Tanaka, Fukui (JP); Akihiko Yamazaki, Fukui (JP); Shinichi Okuyama, Fukui (JP); Yasutake Seki, Fukui (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/494,600

(22) PCT Filed: Nov. 8, 2002

(86) PCT No.: PCT/JP02/11664

§ 371 (c)(1),
(2), (4) Date: Oct. 8, 2004

(87) PCT Pub. No.: WO03/041244

PCT Pub. Date: May 15, 2003

(65) Prior Publication Data

US 2005/0035680 A1     Feb. 17, 2005

(30) Foreign Application Priority Data

Nov. 8, 2001     (JP)     ............................. 2001-342907

(51) Int. Cl.
*H02K 1/00*     (2006.01)
(52) U.S. Cl. ..................................... 310/216; 310/254
(58) Field of Classification Search ................ 310/216, 310/217, 218, 266, 269, 214, 194, 254, 258
See application file for complete search history.

(56) References Cited

U.S. PATENT DOCUMENTS 5,852,335 A * 12/1998 Suzuki et al. ............... 310/254

(Continued)

FOREIGN PATENT DOCUMENTS

EP     0 872 943     10/1998

(Continued)

OTHER PUBLICATIONS

International Search Report corresponding to application No. PCT/JP02/11664 dated Feb. 18, 2003.

*Primary Examiner*—Thanh Lam
(74) *Attorney, Agent, or Firm*—RatnerPrestia

(57) ABSTRACT

The objective of this invention is to provide a motor which can reduce occurrence of a torque reduction in the overload, and also lower the temperature of a motor main body immediately even in the case of a temperature rise in the motor main body.

This motor comprises: a stator 20 that is constituted by a stator main body 1 having a plurality of slots 4 formed on the circumference of the main body with equal intervals from each other and teeth 3 each of which is located between the slots 4, and extends outward along the radial direction from the slot bottom face of the slots 4 with the same width, and a coil bobbin 7 that is attached to each of the teeth 3 of the stator main body 1, and is formed by winding a wire 6 around a bobbin 5 that has been preliminarily made from an insulating material such as a resin, in a concentrated winding system; and a rotor 2 that is maintained on the circumference of the stator 20 concentrically with the stator main body 1, in a manner so as to face the stator main body 1 through a predetermined air gap 19.

16 Claims, 8 Drawing Sheets

U.S. PATENT DOCUMENTS

| | | | |
|---|---|---|---|
| 5,866,961 A * | 2/1999 | Suzuki et al. | 310/67 R |
| 6,081,058 A * | 6/2000 | Suzuki et al. | 310/156.45 |
| 6,177,751 B1 | 1/2001 | Suzuki et al. | |
| 6,541,889 B2 * | 4/2003 | Moroto et al. | 310/216 |
| 6,566,779 B2 * | 5/2003 | Takano et al. | 310/214 |
| 6,595,760 B2 * | 7/2003 | Shida et al. | 417/410.1 |

FOREIGN PATENT DOCUMENTS

| | | | | |
|---|---|---|---|---|
| JP | 56-110788 | 8/1981 | | |
| JP | 403143238 | * 6/1991 | | 310/156.28 |
| JP | 5-76146 | 3/1993 | | |
| JP | 5-308742 | 11/1993 | | |
| JP | 7-59317 | 3/1995 | | |
| JP | 8-186967 | 7/1996 | | |
| JP | 9-135546 | 5/1997 | | |
| JP | 10-336980 | 12/1998 | | |

* cited by examiner

MOTOR

This Application is a U.S. National Phase Application of PCT International Application PCT/JP02/11664 filed on Nov. 8, 2002.

TECHNICAL FIELD

The present invention relates to a motor that is used with short-time rating.

BACKGROUND ART

FIG. 10 shows a stator structure that is incorporated in a conventional motor, and in this Figure, reference numeral 1 represents a stator main body, 2 represents a rotor, 4 represents a slot and 17 represents a tooth having a widened portion on its tip. Here, this Figure is a partial drawing that is ¼ divided, and actually, both the stator main body and the rotor have a 360-degree circumferential shape. Moreover, this Figure illustrates a winding specification per one phase.

In the stator structure shown in FIG. 10, the stator main body 1 has a plurality of slots 4 and teeth 17, and a coil (not shown) is wound on each of the teeth 17 in a concentrated winding system to finally form a stator. Further, a rotor 2 having a gear shape is maintained on the circumference of the stator main body 1 so as to freely rotate concentrically with the stator 1, in a manner so as to face the stator main body 1 through an air gap 19 formed on the inner circumferential side thereof.

The motor having a stator structure of this type is referred to as a reluctance motor, and, for example, the reluctance motor shown in FIG. 10, which has eighteen slots in the stator main body with twelve teeth of the rotor, is referred to as a 18/12 reluctance motor.

The reluctance motor is constituted by only laminated electromagnetic steel plates and coils, and the number of the teeth is eighteen that is the same as the number of the slots, and each of the teeth is individually provided with a coil in the concentrated winding system.

When a coil current is allowed to flow in a direction shown in FIG. 10 (symbol ○ indicates a direction of current flowing from the rear side to the surface side of the Figure, and symbol ○X indicates a direction of current flowing from the surface side to the rear side of the Figure), the rotor 2 is attracted by a magnetomotive force generated by the coil current of the stator main body 1 and, in the example of FIG. 10, a torque is generated clockwise so that it is allowed to continuously rotate by switching the phase of the current to be applied in accordance with the rotation position of the rotor. Formula (1) shows a torque formula of the reluctance torque.

$$T = \frac{1}{2} i^2 \frac{\partial L}{\partial \theta} \quad (1)$$

In formula (1), "T" represents a torque, "i" represents a current, "L" represents a winding inductance and "θ" represents a rotation position. As clearly shown by formula (1), torque "T" is proportional to the square of current "i", and is also proportional to the rate of change of winding inductance "L" by rotor position "θ".

In the stator main body 1 of a conventional reluctance motor, with respect to the width of the tooth 17, a tooth width "W2" on the side facing the air gap 19 of the rotor 2 outside the main body is wider than a tooth width "W1" on the slot bottom face side.

The reason that the tooth width "W2" on the surface side facing the air gap 19 is made wider is because this structure prevents the coil wound inside the slot from jumping out of the slot 4 during the rotation of the motor, and also makes it possible to increase the amount of magnetic flux that enters the stator main body 1 from the rotor 2 through the air gap 19.

FIG. 11 shows a current-torque characteristic of the conventional reluctance motor having the stator structure shown in FIG. 10. In this FIG. 11, the theoretical value, calculated from formula (1), is indicated by a broken line, and the measured value is indicated by a solid line. Since the torque is proportional to the square of the current as shown in formula (1), the torque characteristic is represented by the theoretical value; however, actually, the torque increasing rate becomes lower as the current increases, resulting in a characteristic as indicated by the solid line.

However, in the above-mentioned conventional reluctance motor, as the current increases, the torque increasing rate becomes lower, with the result that the torque decreases in comparison with the theoretical value.

This is because when the current increases due to an excessive load, a magnetic saturation occurs in the rotor and stator to cause a reduction in inductance "L".

In recent years, along with growing consciousness for the global environment, various equipments that take this point into consideration have been proposed, and many products of this type have been supplied to the market. In the field of automobiles also, automobiles, which use motors and an internal combustion engine using conventional fossil fuel or use only motors, that is, so-called electric automobiles, have been developed and sold.

The major subject with such automobiles is how to improve the mileage, and with respect to the motor to be used therein, there have been strong demands for small size and light weight.

Therefore, with respect to motors to be used with short-time rating, for example, those used in ABS devices and the like, in the case of the motor that causes a torque reduction when an attempt is made to obtain a predetermined torque, it is necessary to increase the thickness of laminated layers or the like, and this causes an increase in the weight, and the subsequent increase in the weight of the automobile or the like to carry the motor. Consequently, the mileage is lowered.

Moreover, the motor has an abrupt temperature rise due to use with short-time rating, resulting in degradation in reliability of insulating materials and the like.

DISCLOSURE OF THE INVENTION

The present invention has been devised to solve the above-mentioned problems, and its objective is to provide a motor which can prevent the occurrence of a torque reduction even at the time of overloading, can immediately reduce the temperature of the motor main body upon an increase in the temperature of the motor main body, and has a high torque with a superior heat radiating property.

In a first aspect of the present invention, there is provided a motor comprising: a stator that is constituted by a stator main body having a plurality of slots formed on the circumference of a main body with equal intervals from each other and teeth each of which is located between the slots, and extends outward along the radial direction from the slot bottom face with the same width, and a coil bobbin that is attached to each of the teeth of the stator main body, and is formed by winding a wire around a bobbin that has been preliminarily made from an insulating material such as a resin, in a concentrated winding system; and a rotor that has a gear shape and is maintained on the circumference of the stator concentrically with the stator main body, in a manner so as to face the stator through a predetermined air gap. With this arrangement, it becomes possible to improve the space factor of the coil, and also to alleviate magnetic saturation in the overload.

In a second aspect of the present invention, there is provided a motor comprising: a stator that is constituted by a stator main body having a plurality of slots formed on the circumference of a main body with equal intervals from each other and teeth each of which is located between the slots, and extends outward along the radial direction from the slot bottom face with the same width, and a coil bobbin that is attached to each of the teeth of the stator main body, and is formed by winding a wire around a bobbin that has been preliminarily made from an insulating material such as a resin, in a concentrated winding system; and an embedding magnet type rotor that has a permanent magnet embedded therein, and is maintained on the circumference of the stator concentrically with the stator main body, in a manner so as to face the stator through a predetermined air gap. With this arrangement, it becomes possible to improve the space factor of the coil, and also to alleviate magnetic saturation in the overload.

In a third aspect of the present invention, there is provided a motor comprising: a stator that is constituted by a stator main body having a plurality of slots formed on the circumference of a main body with equal intervals from each other and teeth each of which is located between the slots, and extends outward along the radial direction from the slot bottom face with the same width, and a coil bobbin that is attached to each of the teeth of the stator main body, and is formed by winding a wire around a bobbin that has been preliminarily made from an insulating material such as a resin, in a concentrated winding system, and a coil bobbin that is attached to each of the teeth of the stator main body, and is formed by winding a wire around a bobbin that has been preliminarily made from an insulating material such as a resin, in a concentrated winding system; and a surface magnet type rotor that is maintained on the circumference of the stator concentrically with the stator main body, in a manner so as to face the stator through a predetermined air gap. With a magnet being placed on a surface on the opposing side, and with this arrangement, it becomes possible to improve the space factor of the coil, and also to alleviate magnetic saturation in the overload.

In a fourth aspect of the present invention, there is provided a motor comprising: a stator that is constituted by a stator main body having a plurality of slots formed on the circumference of a main body with equal intervals from each other and teeth each of which is located between the slots, and extends outward along the radial direction from the slot bottom face with the same width, and a coil bobbin that is attached to each of the teeth of the stator main body, and is formed by winding a wire around a bobbin that has been preliminarily made from an insulating material such as a resin, in a concentrated winding system, and a coil bobbin that is attached to each of the teeth of the stator main body, and is formed by winding a wire around a bobbin that has been preliminarily made from an insulating material such as a resin, in a concentrated winding system; and a rotor that has a plurality of slits formed therein, and is maintained on the circumference of the stator concentrically with the stator main body, in a manner so as to face the stator through a predetermined air gap. With this arrangement, it becomes possible to improve the space factor of the coil, and also to alleviate magnetic saturation in the overload.

A fifth aspect of the present invention relates to a motor in accordance with any one of the first to fourth aspects, and this motor is constituted by connection-use end plates formed by coating wire connections and conduction plates with an insulating material. With this arrangement, it becomes possible to suppress heat generation from the connected portion even upon application of a large current.

A sixth aspect of the present invention relates to a motor in accordance with any one of the first to fifth aspects, and this motor is characterized in that the stator is entirely molded by a resin; thus, it becomes possible to improve the heat radiating performance of the motor.

A seventh aspect of the present invention relates to a motor in accordance with any one of the first to sixth aspects, and this motor is characterized in that the rotor is molded by a resin; thus, it becomes possible to improve the heat radiating performance of the motor.

An eighth aspect of the present invention relates to a motor that is used with short-time rating, and this motor is characterized by having the structure in accordance with any one of the first to seventh aspects; thus, even at the time of an abrupt temperature rise in the motor main body, it becomes possible to lower the temperature of the motor main body immediately after the motor stop.

A ninth aspect of the present invention relates to an automobile that is equipped with a motor in accordance with any one of the first to eighth aspects; thus, it becomes possible to improve the mileage of the automobile.

BEST MODE FOR CARRYING OUT THE INVENTION

Referring to attached drawings, the following description discusses embodiments of the present invention. Here, the following embodiments are merely examples which materialize this invention, and these do not limit the technical range of this invention.

Figure 1:
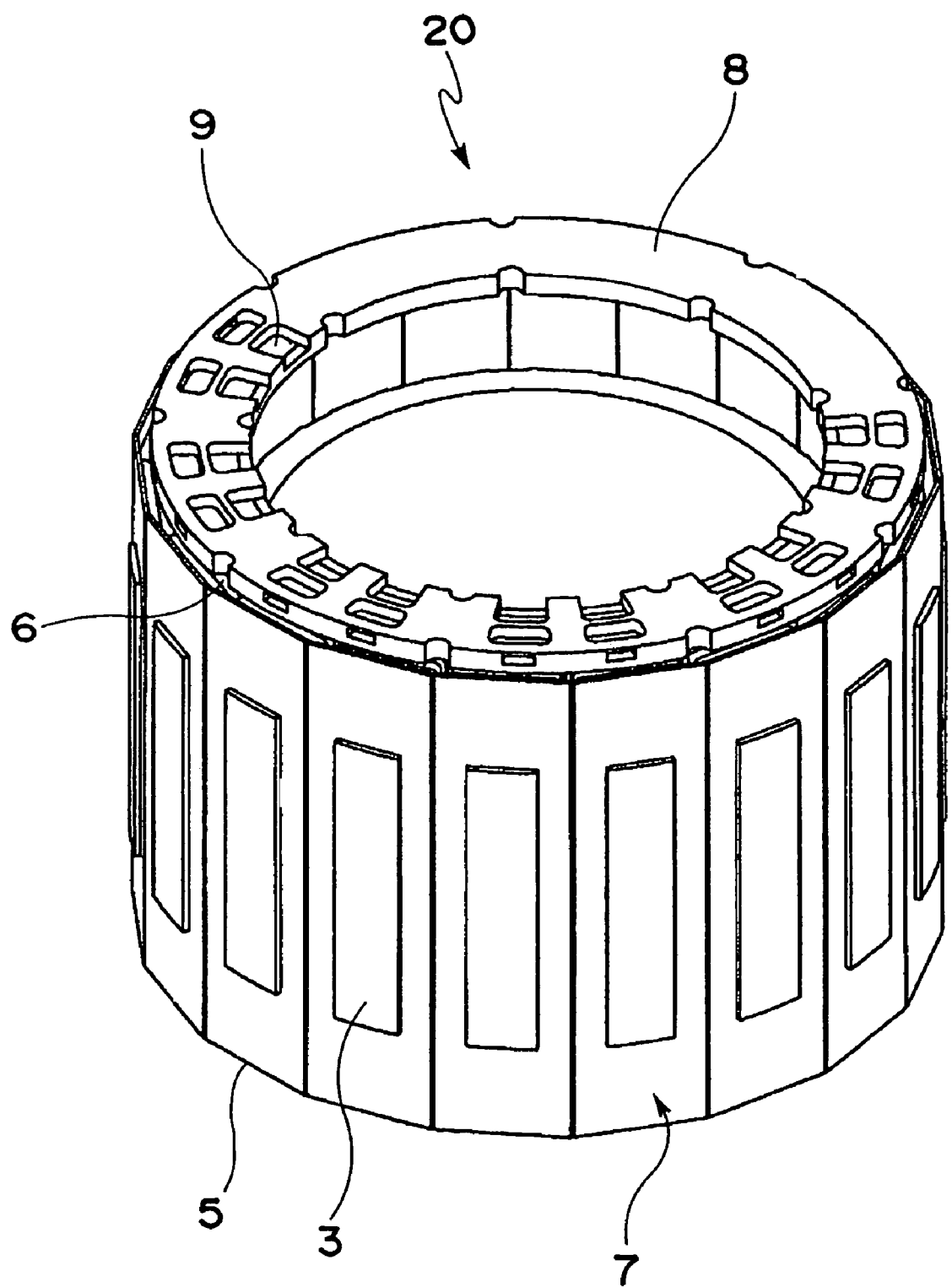
FIG. 1 illustrates a stator of the present invention.

FIG. 1 shows a stator of the present invention, and in this Figure, reference numeral 3 is a tooth, 5 is a bobbin, 6 is a wire, 7 is a coil bobbin, 8 is a connection-use end plate, 9 is a conductor plate and 20 is a stator.

Figure 2:
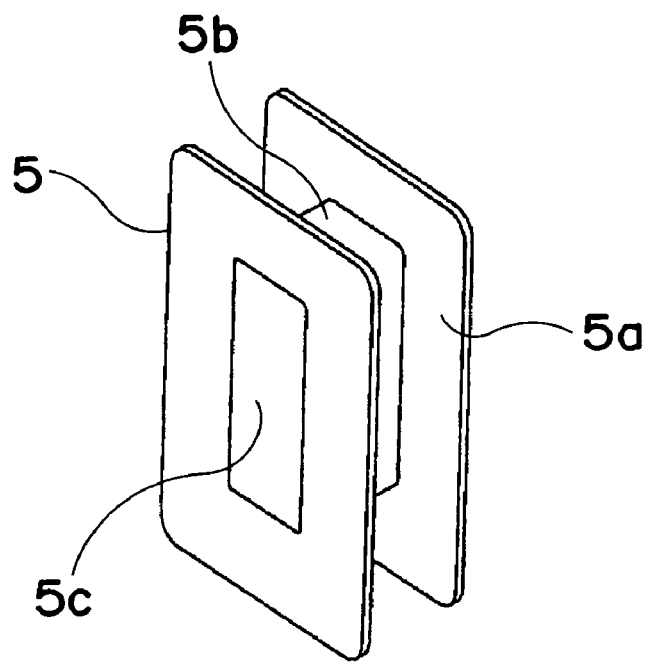
FIG. 2 illustrates a resin bobbin of the present invention.

As shown in FIG. 2, the bobbins 5 are attached to a stator main body 1 (see FIG. 4) in the radial direction thereof, and each of the bobbins 5 is constituted by an end face wall 5a that defines both of the end faces in the radial direction and prevents overflow (protrusion toward the stator outer diameter side) of the wire 6 when wound around it, a winding portion 5b on which the wire 6 is wound and an attaching hole 5c that allows the attachment to tooth 3 (see FIG. 2).

Figure 3:
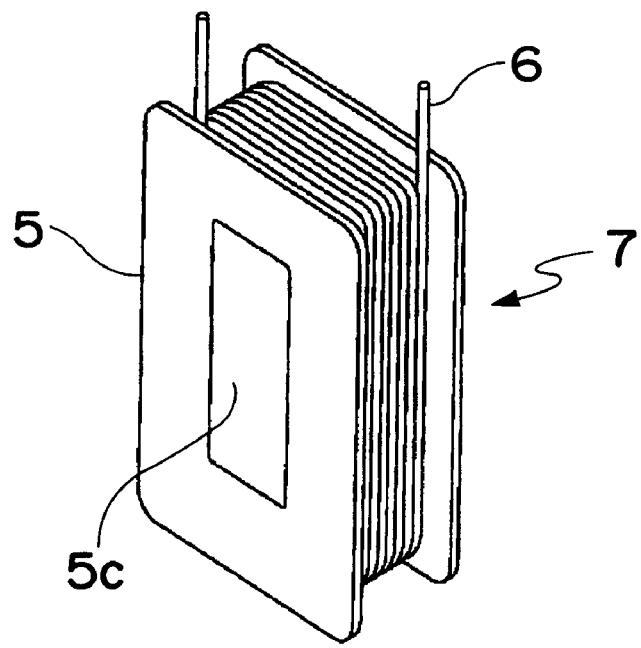
FIG. 3 illustrates a coil bobbin on which a wire is wound around the resin bobbin as an alignment roll in the present invention.

FIG. 3 shows a coil bobbin 7 in which the wire 6 is wound around the bobbin 5 as an alignment roll. Moreover, with respect to the wire 6, the winding start portion and the winding end portion are taken out in the same direction so that the connections of the wire 6 are made on one side face of the stator 1.

In this manner, since the wire 6 has been preliminarily wound around the bobbin 5, it becomes possible to greatly improve the space factor of the coil, and also to reduce heat generation from the wire 6.

Figure 4:
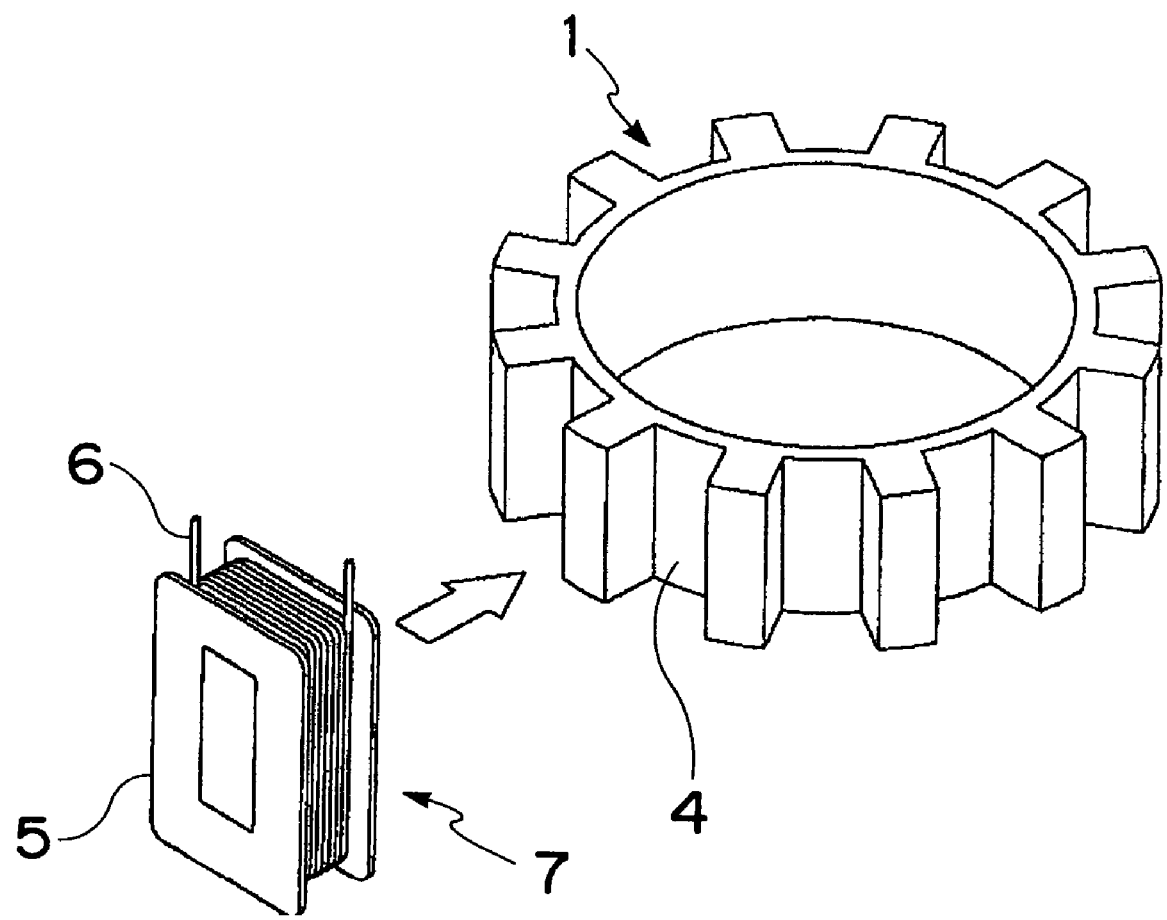
FIG. 4 illustrates the stator prior to the attachment of the coil bobbin in the present invention.

FIG. 4 shows a stator main body 1 prior to the attachment of the coil bobbin 7. The width "W" of the tooth 3 is the same from the bottom face side of the slot 4 to the outside end in the radial direction; however, with this arrangement of the coil bobbin 7, even in the case of the stator main body 1 with a fixed width of the tooth 3, it is possible to secure the wire 6 without causing the wire 6 inside the slot 4 to protrude on the air gap 19 side of the rotor 2. Moreover, since this motor is a reluctance motor of a so-called outer rotor type, it is possible to easily attach the coil bobbin 7.

Figure 5:
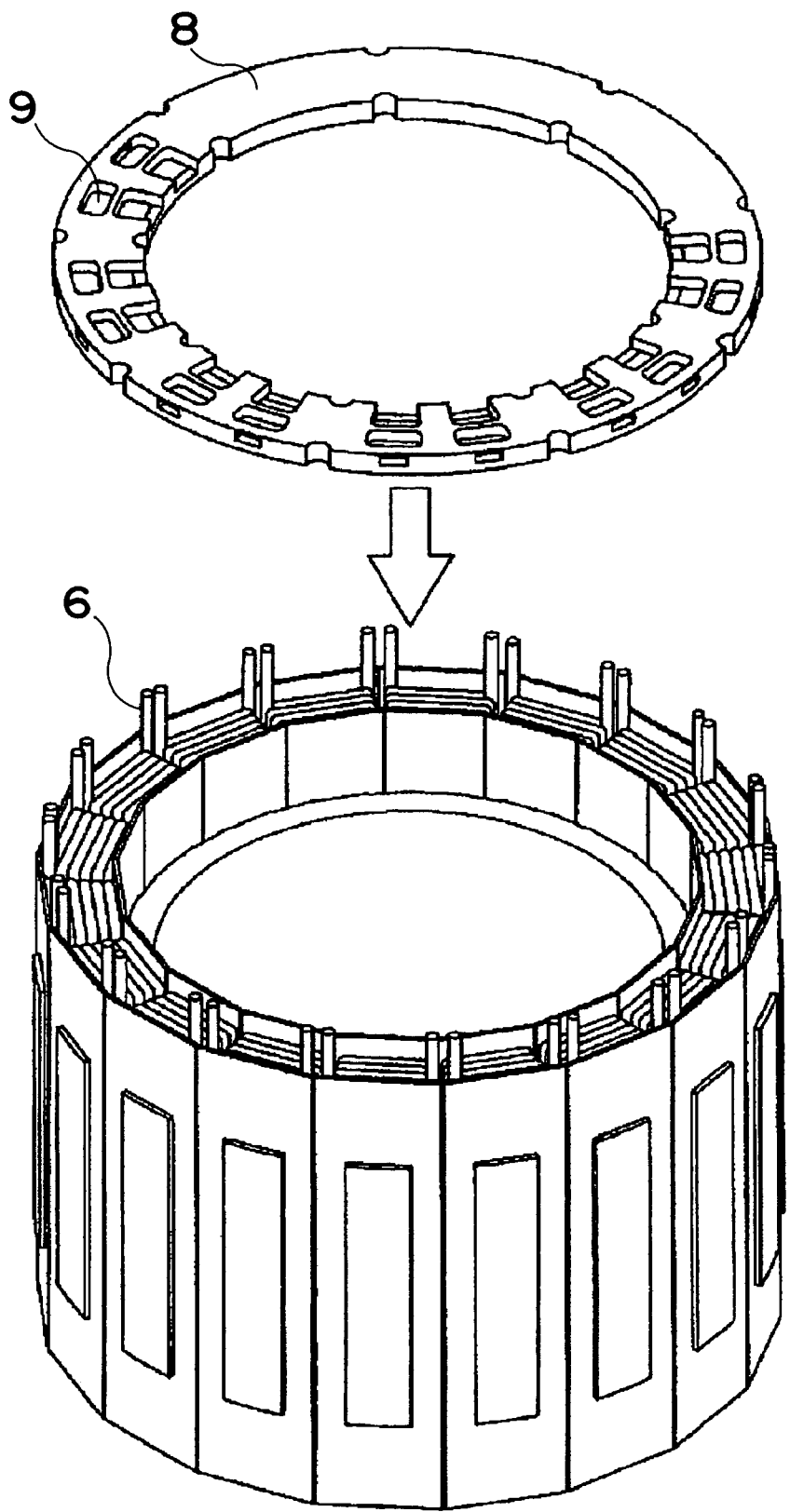
FIG. 5 illustrates a connection state between wires and a connection-use end plate in the present invention.
Figure 6:
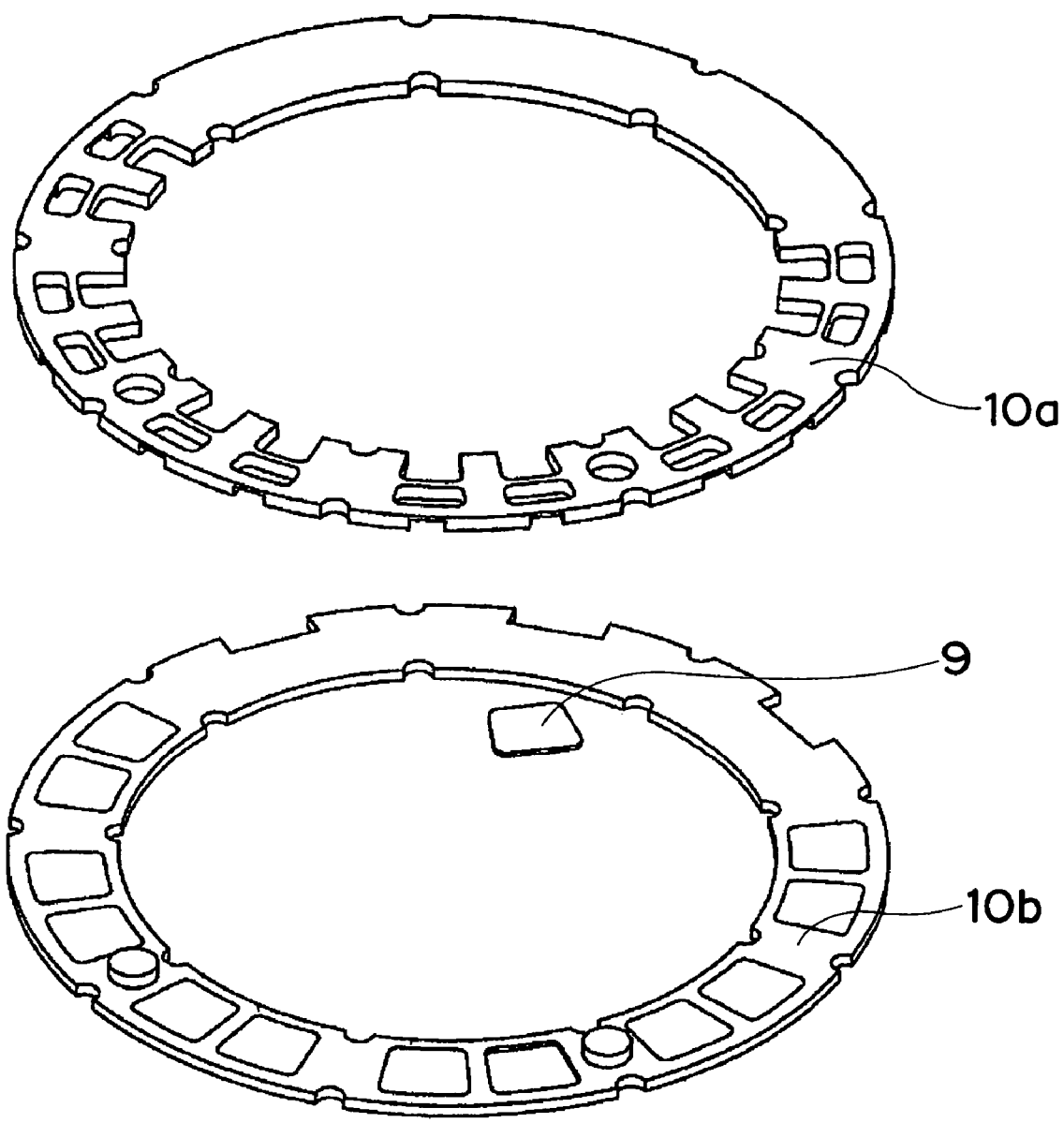
FIG. 6 illustrates one example of the connection-use end plate of the present invention.

FIG. 5 shows a connection state between the wires 6 and a connection-use end plate 8. The connection-use end plate 8 has a structure in which a conductor plate 9 is integrally molded by an insulating material such as a resin, or a structure in which, as shown in FIG. 6, a conductor plate 9 is sandwiched between an upper end plate 10a and a lower end plate 10b. Moreover, the connection between the conductor plate 9 and the wire 6 is made through a method such as soldering and fusing.

Figure 7:
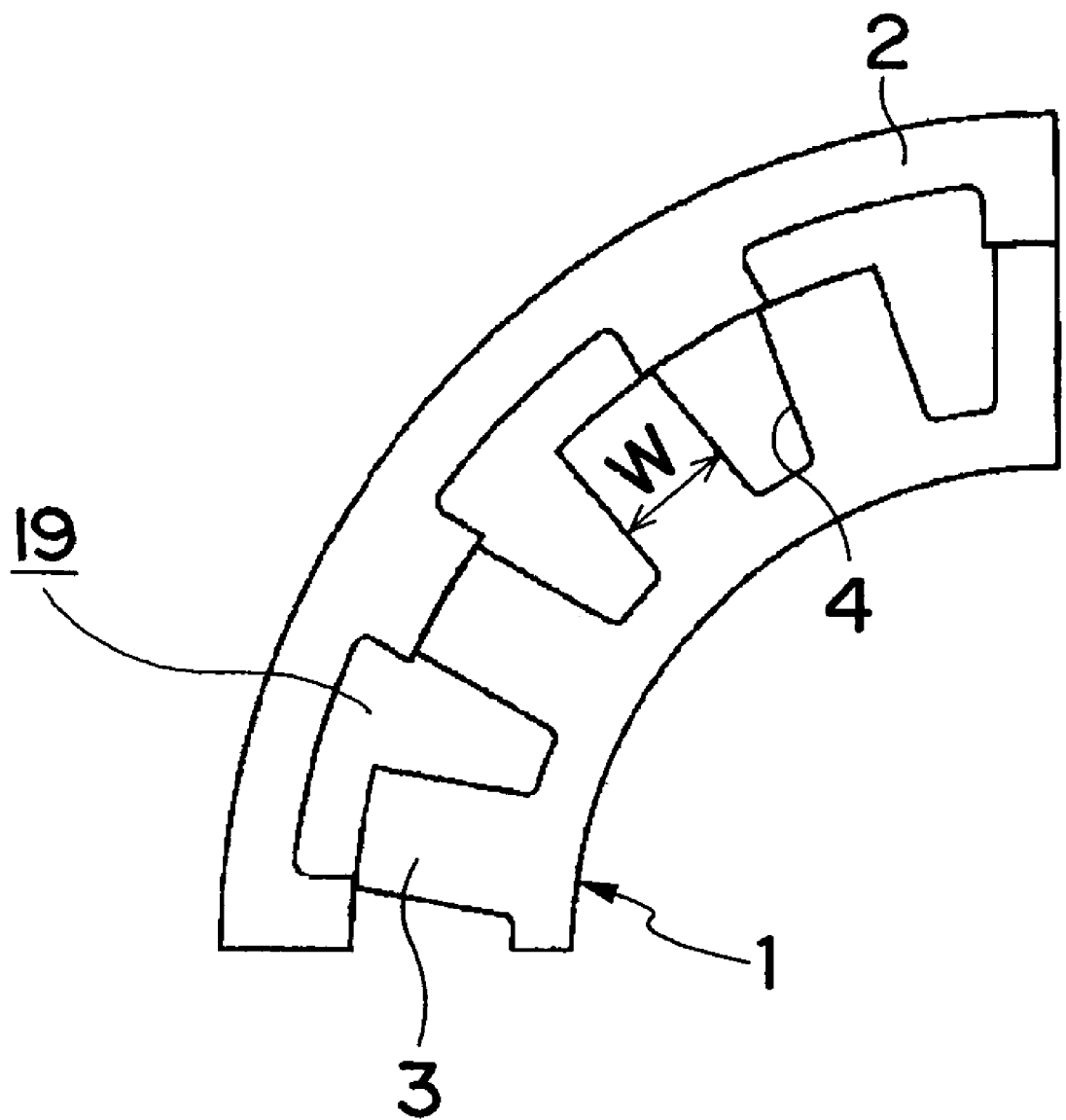
FIG. 7 is a partial cross-sectional view that shows a reluctance motor of the present invention.
Figure 8:
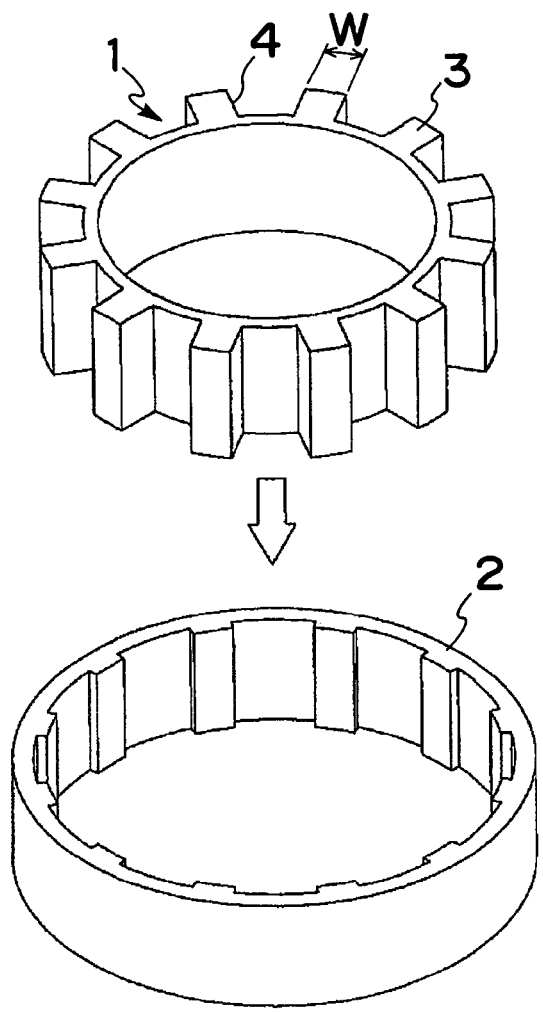
FIG. 8 is a perspective view that shows the reluctance motor of the present invention.

FIGS. 7 and 8 show a motor (the coil bobbin 7 and the connection-use end plate 8 of which are not shown) that is an embodiment of the present invention, and this motor is a so-called reluctance motor that has a rotor 2, which has a gear shape and is maintained on the circumference of the stator 20 concentrically with the stator main body 1, in a manner so as to face the stator 20 through an air gap 19. Here, FIG. 7 is a partial drawing that is ¼ divided, and actually, both the stator main body and the rotor have a 360-degree circumferential shape.

Figure 10:
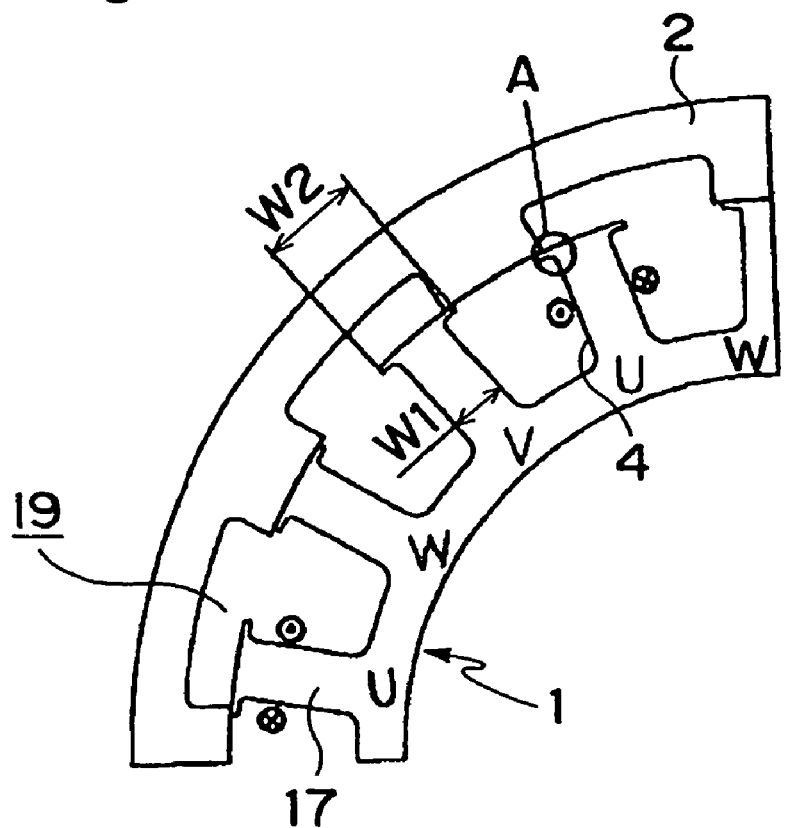
FIG. 10 is a partial cross-sectional view that typically shows a conventional reluctance motor.
Figure 11:
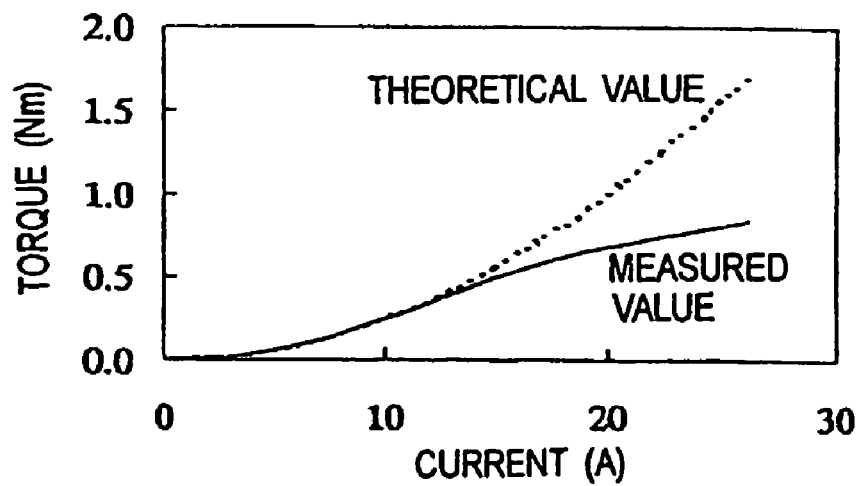
FIG. 11 shows a torque performance of the conventional reluctance motor.

With this arrangement, the width "W" of the tooth 3 of the stator main body 1 is made to have the same value from the slot bottom portion to the air gap surface portion so that it is possible to eliminate magnetic saturation (generated at portion "A" of FIG. 10) that has been caused in a conventional reluctance motor, to alleviate torque saturation in the overload, and consequently to achieve a reluctance motor with high torque.

Figure 9:
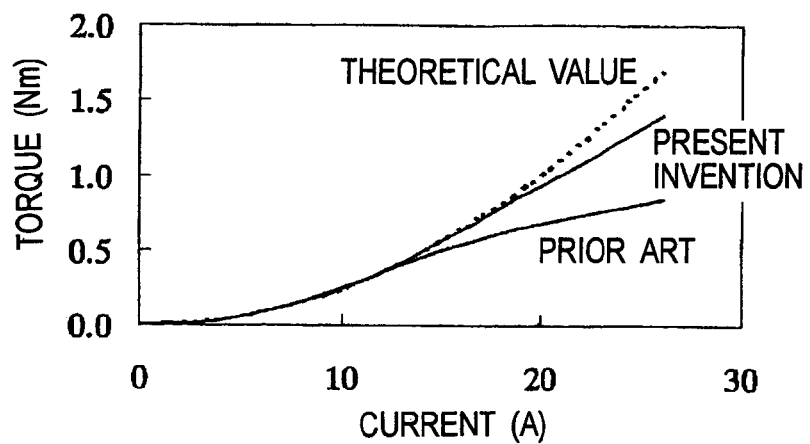
FIG. 9 shows a torque performance of the reluctance motor of the present invention.

FIG. 9 shows a relationship between the torque and the current in the present invention. Since the motor of the present invention alleviates magnetic saturation, it becomes possible to achieve a motor which has a greater torque constant in comparison with the conventional stator.

With respect to the stator 20 (for example, see FIG. 1) as described above, it becomes possible to secure the coil bobbin 7 more firmly thereto by molding its entire portion with resin; thus, it is possible to reduce vibration of the reluctance motor, and also to efficiently radiate heat generated from the coil during driving and at the time of the motor stop by using a resin having a thermal conductivity higher than that of air.

When such a reluctance motor is applied to an ABS device for use in an automobile, positive controlling operations are available, without any increase in the automobile weight. Moreover, the devices of this type are normally used not for a long time over several hours, but for a short time within not more than 10 minutes, with short-time rating. Upon application of this type, even when a large current is applied for driving to cause a temperature rise in the reluctance motor main body, the temperature of the reluctance motor can be lowered before the next operation. Here, with respect to motors for devices such as a power window and a power steering device, the present invention of course provides the same effects.

The above explanation has been given to, for example, a reluctance motor; however, the present invention is also applicable to an embedding magnet type synchronous motor having a permanent magnet embedded inside the rotor, a surface magnet type synchronous motor with a magnet being placed on the surface of the rotor and a synchronous reluctance motor having a plurality of slots inside the rotor, and the same effects as described above can be obtained.

INDUSTRIAL APPLICABILITY

The motor of the present invention comprises: a stator that is constituted by a stator main body having a plurality of slots formed on the circumference of a main body with equal intervals from each other and teeth each of which is located between the slots, and extends outward along the radial direction from the slot bottom face with the same width, and a coil bobbin that is attached to each of the teeth of the stator main body, and is formed by winding a wire around a bobbin that has been preliminarily made from an insulating material such as a resin, in a concentrated winding system; and a rotor that has a gear shape and is maintained on the circumference of the stator concentrically with the stator main body, in a manner so as to face the stator through a predetermined air gap. Therefore, it becomes possible to provide a motor with high torque, which can alleviate magnetic saturation in the overload.

Further, since the connection of the wire can be carried out by using a connection-use end plate containing a conductor plate, it becomes possible to provide a motor with high reliability even in the case of application of a large current.

Moreover, the entire stator or rotor or both of these can be molded with resin so that the heat radiating performance of the motor is improved with reduced vibration; thus, it becomes possible to lower the motor temperature even upon application with short-time rating.

Furthermore, by installing the motor having the above-mentioned superior effects in an automobile, it is possible to reduce the weight of the automobile and also to improve the mileage. Because of the superior heat radiating performance, it becomes possible to improve the reliability of the automobile.

The invention claimed is:
1. A motor comprising:
a stator that is constituted by a stator main body having a plurality of slots formed on the circumference of a main body with equal intervals from each other and teeth each of which is located between the slots, and extends outward along the radial direction from the slot bottom face with a constant width, and a coil bobbin that is attached to each of the teeth of the stator main body, and is formed by winding a wire around a bobbin that has been preliminarily made from an insulating material in a concentrated winding system; and a rotor that has a gear shape and is maintained on the circumference of the stator concentrically with the stator main body, in a manner so as to face the stator through a predetermined air gap, wherein each of said teeth extends beyond an outer circumference of its respective attached coil bobbin toward the rotor.

2. A motor comprising:

a stator that is constituted by a stator main body having a plurality of slots formed on the circumference of a main body with equal intervals from each other and teeth each of which is located between the slots, and extends outward along the radial direction from the slot bottom face with a constant width, and a coil bobbin that is attached to each of the teeth of the stator main body, and is formed by winding a wire around a bobbin that has been preliminarily made from an insulating material, in a concentrated winding system; and a rotor that has a plurality of slits formed therein, and is maintained on the circumference of the stator concentrically with the stator main body, in a manner so as to face the stator through a predetermined air gap, wherein each of said teeth extends beyond an outer circumference of its respective attached coil bobbin toward the rotor.

3. The motor according to claim 1, wherein connections of the wire are made using connection-use end plates formed by coating conduction plates with an insulating material.

4. The motor according to claim 1, wherein the stator is entirely molded by a resin.

5. The motor according to claim 1, wherein the rotor is molded by a resin.

6. The motor according to claim 1, wherein said motor is used with short-time rating.

7. The motor according to claim 1, wherein said motor is included in an automobile.

8. The motor according to claim 2, wherein connections of the wire are made using connection-use end plates formed by coating conduction plates with an insulating material.

9. The motor according to claim 2, wherein the stator is entirely molded by a resin.

10. The motor according to claim 2, wherein the rotor is molded by a resin.

11. The motor according to claim 2, wherein said motor is used with short-time rating.

12. The motor according to claim 2, wherein said motor is included in an automobile.

13. The motor of claim 1, wherein the insulating material of the bobbin does not contain ferromagnetic material.

14. The motor of claim 1, wherein the insulating material of the bobbin is a resin.

15. The motor of claim 2, wherein the insulating material of the bobbin does not contain ferromagnetic material.

16. The motor of claim 2, wherein the insulating material of the bobbin is a resin.

* * * * *